United States Patent
Shen et al.

(10) Patent No.: US 11,905,459 B2
(45) Date of Patent: Feb. 20, 2024

(54) METHOD TO MITIGATE HALITE SCALE

(71) Applicant: Baker Hughes Oilfield Operations LLC, Houston, TX (US)

(72) Inventors: Dong Shen, The Woodlands, TX (US); Haiping Lu, Sugar Land, TX (US); Daniel Philip Bestgen, Rapid City, SC (US); Kung-Po Chao, Sugar Land, TX (US); Joseph Penkala, Denver, CO (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/826,026

(22) Filed: May 26, 2022

(65) Prior Publication Data

US 2023/0383171 A1    Nov. 30, 2023

(51) Int. Cl.
*C09K 8/528* (2006.01)

(52) U.S. Cl.
CPC .................. *C09K 8/528* (2013.01)

(58) Field of Classification Search
CPC .................................... C09K 8/528
See application file for complete search history.

(56) References Cited

U.S. PATENT DOCUMENTS

| | | | |
|---|---|---|---|
| 7,028,776 B2 * | 4/2006 | Kirk | C09K 8/528 |
| | | | 166/371 |
| 7,494,955 B2 | 2/2009 | Charudattan et al. | |
| 8,336,624 B2 | 12/2012 | Becker et al. | |
| 9,879,173 B2 | 1/2018 | Steiner et al. | |
| 2011/0024366 A1 | 2/2011 | Keatch et al. | |
| 2013/0213657 A1 | 8/2013 | Dobson, Jr. et al. | |
| 2015/0368544 A1 * | 12/2015 | Angman | C09K 8/54 |
| | | | 210/698 |
| 2016/0369155 A1 | 12/2016 | Angman et al. | |
| 2017/0029691 A1 | 2/2017 | Faust et al. | |
| 2018/0057731 A1 | 3/2018 | Duong et al. | |
| 2018/0118998 A1 | 5/2018 | Lavene et al. | |
| 2018/0148632 A1 | 5/2018 | Bennett et al. | |
| 2022/0081606 A1 * | 3/2022 | Howe | C09K 8/528 |

OTHER PUBLICATIONS

Yong (A. Yong et al., Influence of natural gas production chemicals on scale production in MEG regeneration systems, Chemical Engineering Science, 2015, 130, 172-182).*
International Search Report and Written Opinion issued in connection with corresponding PCT Application No. PCT/US2023/023713, dated Sep. 8, 2023.

* cited by examiner

*Primary Examiner* — Kumar R Bhushan
(74) *Attorney, Agent, or Firm* — Crowe & Dunlevy, P.C.

(57) ABSTRACT

Halite scales in an oilfield brine that has a potential for halite scaling can have halite scale formation inhibited or prevented by adding an effective amount of an additive, where the additive contains at least one non-water-soluble quaternary ammonium compound and at least one organic solvent. The quaternary ammonium compound may be benzyl-alkyldimethyl ammonium chloride, where the alkyl group has from 2 to 30 carbon atoms. The organic solvent may be one or more alcohol or glycol.

12 Claims, 2 Drawing Sheets

METHOD TO MITIGATE HALITE SCALE

TECHNICAL FIELD

The present invention relates to methods and compositions for inhibiting or preventing halite scaling in brines, and more particularly relates, in one non-limiting embodiment, to methods and compositions for inhibiting or preventing halite scaling in oilfield brines by introducing an effective amount of a quaternary ammonium compound.

BACKGROUND

Oil and gas production typically involves drilling wells to extract the oil and gas from underground formations. The extracted oil and gas often are accompanied by brine. Brine can also be referred to as a type of "produced water". As the brine proceeds through the well from the formation to the surface, dissolved salts can precipitate and form scale on surfaces of the well and related equipment because of pressure, pH and temperature changes and water evaporates. Scaling can also result from the practice of brine injection into a formation to maintain pressure and sweep the oil and gas to producing wells. Some common oilfield scales are halite, calcite, barite, celestite, anhydrite, gypsum and iron sulfide.

The formation of scales on surfaces of the well and related equipment is a major production problem. Scale build-up reduces well productivity and shortens the lifetime of production equipment.

Halite scale formation inhibition in particular is one of the most challenging issues as oil and gas are produced in a high TDS brine environment. By "high TDS brine" is meant the total dissolved solid (TDS) is greater than 250,000 mg/L, where halite scale has the possibility to form. Halite scales include, but are not necessarily limited to, sodium chloride (NaCl), potassium chloride (KCl), and the like, and mixtures thereof.

Although the best practice in the field for halite scale treatment is to inject fresh water to dilute the halite scaling brines, it is not practical in locations lacking a nearby source of fresh water. Therefore, many studies have been conducted for the investigation of the chemistry and performance of halite scale inhibitors. The most common halite inhibitors, such as NTAA (nitrilotriacetamide) and potassium ferrocyanide ($K_3Fe(CN)_6$), are water soluble compounds. The treatment dosages of NTAA are very high and the performance are not very significant without treatment with fresh water dilution. The usage of potassium ferrocyanide is very limited due to its toxicity to human being and environment.

It would be desirable to develop new and/or alternative compositions and methods that would inhibit or prevent the formation of halite scales.

SUMMARY

There is provided, in one non-limiting version, a method for inhibiting or preventing the formation of halite scales in an oilfield brine, which method comprises adding to an oilfield brine having a potential for halite scaling an amount of an additive effective to inhibit or prevent the formation of halite scales in the oilfield brine, where the additive includes at least one quaternary ammonium compound that is benzyl-alkyldimethyl ammonium chloride, where the alkyl group has from 2 to 30 carbon atoms and at least one organic solvent.

In another non-restrictive embodiment, there is provided a treated oilfield brine that includes an oilfield brine having a potential for halite scaling and an additive in an amount effective to inhibit or prevent the formation of halite scales in the oilfield brine, where the additive includes at least one quaternary ammonium compound that is benzyl-alkyldimethyl ammonium chloride, where the alkyl group has from 2 to 30 carbon atoms and at least one organic solvent.

DETAILED DESCRIPTION

Figure 1:
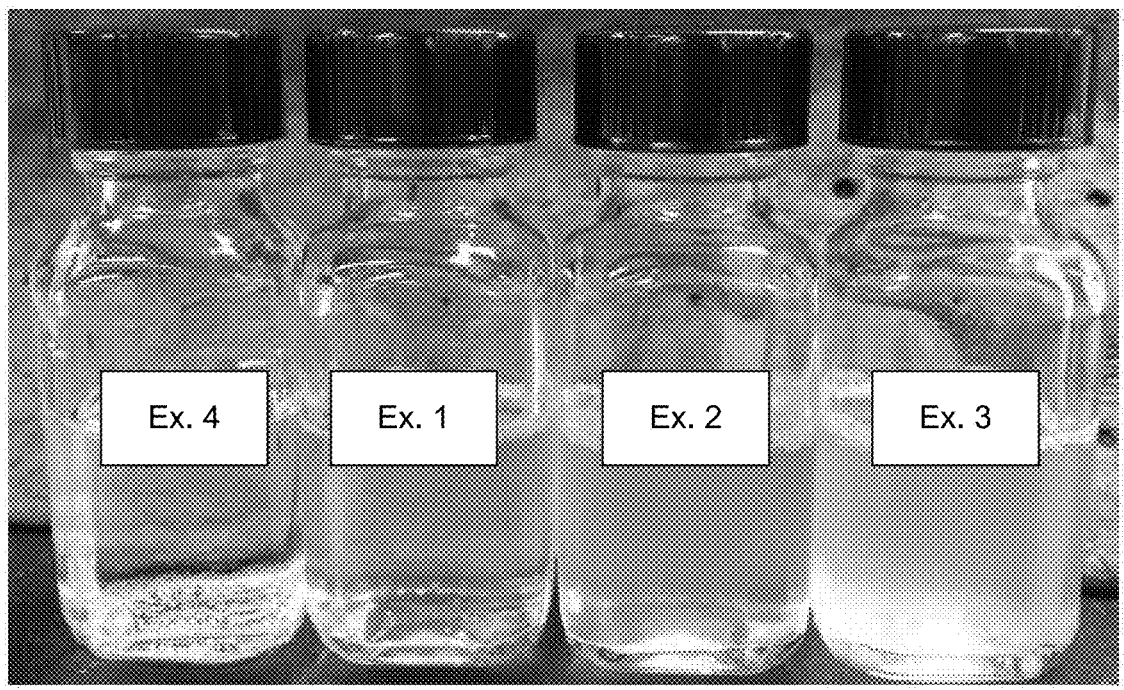
FIG. 1 is a photograph of four bottles of a brine having none and various dosages of benzyl-alkyldimethyl chloride after 30 minutes.

It has been discovered that a non-water-soluble quaternary ammonium compound, in particular a benzyl-alkyldimethyl ammonium chloride where the alkyl group has from 2 to 30 carbon atoms, is able to effectively prevent or mitigate the formation of halite salts in oilfield brines.

The method described herein may be used to inhibit or prevent the formation of halite scale in any oilfield brine that has, or potentially has, halite scale tendencies during production. Brines are saline liquids commonly used by operators in completion operations, and in particular when penetrating pay zones. However, brines can also be produced water in conjunction with the production of oil and gas. In any event, classes of brines include, but are not necessarily limited to, chloride brines and bromide brines. Chloride brines include other ions, like $Ca^{2+}$, $Mg^{2+}$, $Ba^{2+}$, $Sr^{2+}$, $K^+$, $HCO_3^-$, $SO_4^{2-}$, $CO_3^{2-}$ and combinations of these. It is apparent that sodium chloride brines, and brines containing potassium chloride, as non-limiting examples, would be the ones expected to have halite scale issues. While brines saturated with the chlorides are more likely to cause halite scaling, the methods and additives described herein will also be useful for non-saturated brines as well. It will be appreciated that it is not necessary for the method and additives described herein to completely prevent the formation of halite scale to be considered successful or useful, although such prevention is an acceptable goal. Partially preventing the formation of problematic halite scale is sufficient for the methods and additives to be considered successful.

In one non-limiting embodiment the non-water-soluble quaternary ammonium compound is a benzyl-alkyldimethyl ammonium chloride, which in a non-restrictive example is benzyl-C12-C16-alkyldimethyl chloride (CAS 68424-85-1). More generally, the alkyl dimethyl benzyl ammonium chloride has the structure (I):

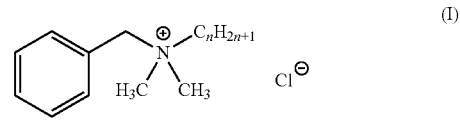

where n ranges from 2 independently to 30; alternatively, n ranges from 12 independently to 16. In another non-limiting embodiment, the quaternary ammonium compound has a weight average molecular weight of from about 150 independently to about 700, alternatively from about 300 independently to about 440. The weight average molecular weight of benzyl-C12-C16-alkyldimethyl chloride is 368.04. As used herein with respect to a range, the term "independently" means that any endpoint may be used together with any other endpoint to form an acceptable alternative range. In a non-restrictive example, the weight average molecular weight of the quaternary ammonium compound may range from about 200 to 440.

Besides the quaternary ammonium compound, the additive also includes a solvent to help deliver and distribute the quaternary ammonium compound into and throughout the brine. Because the brine is largely water and the quaternary ammonium compound is non-water-soluble, the solvent should be such as to encourage and facilitate mixing of the quaternary ammonium compound with the brine. Suitable solvents include, but are not necessarily limited to, methanol, ethanol, monoethylene glycol, diethylene glycol and triethylene glycol, and combinations thereof.

In another non-limiting embodiment, the amount of the quaternary ammonium compound in the additive ranges from about 0.1 wt % independently to about 95 wt %, in another non-restrictive version from about 1 wt % independently to about 55 wt %; alternatively, from about 5 wt % independently to about 20 wt %.

The effective amount of the quaternary ammonium compound additive contained in the brine ranges from about 50 independently to about 50,000 ppm; in another non-restrictive version from about 500 alternatively to about 25,000 ppm; and alternatively, from about 1000 independently to about 3000 ppm. With respect to the active quaternary ammonium compound used in the field, the effective amount of the quaternary ammonium compound in the brine ranges from about 5 independently to about 7,500 ppm; in another non-restrictive version from about 50 alternatively to about 4,000 ppm; and alternatively, from about 100 independently to about 500 ppm.

It will be appreciated that the additive may contain conventional water-soluble halite scale inhibitors, such as such as NTAA (nitrilotriacetamide) and potassium ferrocyanide ($K_3Fe(CN)_6$) or its mixture.

Conventional mineral scale inhibitors may also be included in the additive, including, but not necessarily limited to: a phosphonic acid, a phosphoric acid or a phosphorous acid, phosphate esters, phosphonate/phosphonic acids, the various aminopolycarboxylic acids, chelating agents, and polymeric inhibitors and salts thereof. Included are organo phosphonates, organo phosphates and phosphate esters as well as the corresponding acids and salts thereof.

Polymeric scale inhibitors may also be optionally present, including, but not necessarily limited to, polyacrylamides, salts of acrylamido-methyl propane sulfonate/acrylic acid copolymer (AMPS/AA), phosphonated maleic copolymer (PHOS/MA) or sodium salt of polymaleic acid/acrylic acid/ acrylamido-methyl propane sulfonate terpolymers (PMA/ AMPS), which are also effective. In another non-limiting embodiment, sodium salts are particularly suitable.

Further, the optionally included scale inhibitor may be an amino trimethylene phosphonic acid (ATMP), 1-hydroxy ethylidene-1,1-diphosphonic acid (HEDP), 2-phosphonobutane-1,2,4-(tricarboxylic acid (PBTC), 2-hydroxyethyl-amino-bis(methylenephosphonic acid (HEAMBP), ethylene diamine tetrakis (methylene phosphonic acid) (EDTMP), tetramethylenediamine-tetrakis-(methylene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DTMPM), bis (hexamethylene triamine penta (methylene phosphonic acid) (BHPMP), polyamino polyether methylene phosphonate (PAPEMP) or a salt thereof; phosphino-polycarboxylate (PPCA), polyacrylate (PAA), polymaleic acid (PMA), an acrylic copolymer, sulfonate polyacrylate co-polymer, polyvinyl sulfonate, carboxymethyl inulin, polyaspartates and mixtures thereof.

Temperature can be important to halite scaling. Often halite problems are caused by a sudden dropping of brine temperature. Halite deposition typically forms in downhole locations and wellbore where pressure drops occur (e.g., at pumps, chokes, flowlines, valves, etc.) and at surface equipment (e.g., chokes, flowlines, treater valves, etc.) due to rapid decreases in both temperature and pressure. In one non-limiting embodiment, the temperature of the brine containing the additive ranges from about 0° C. independently to about 350° C., alternatively from about 20° C. independently to about 200° C.

Some quaternary ammonium compounds are known as corrosion inhibitors. However, probably only less than 5% of fluid systems may have a halite scale problem, and there are many types of corrosion inhibitors available to control the corrosion problem in a fluid with halite scale problem, but these corrosion inhibitors could not mitigate the halite scales risk. That is, there is no guarantee that an operator can or would pick a corrosion inhibitor with dual function of inhibiting corrosion and mitigating halite scale if the operator was never aware of an additive's ability to inhibit or prevent halite scale to begin with. As a consequence, the universal expectation is that an operator must add a conventional halite inhibitor to control any halite scale issue. Multiple high TDS (total dissolved solids) wells with various quaternary-containing corrosion inhibitors have been treated over the years which did not demonstrate halite inhibition as those wells required conventional fresh water treatment to manage the halite issues.

It was unexpectedly discovered during field observations applying the quaternary ammonium compounds described herein that the product demonstrated halite scale inhibition properties in that the treated wells in high salinity areas did not require fresh water treatment to manage halite, whereas wells in the same operating area (or in a few cases on the same production pad) that were treated with conventional corrosion inhibitors did require fresh water treatment. The halite inhibition monitoring program included well workover operations, surface equipment locations (e.g., flowlines and treater dump valves), and water analysis monitoring.

The invention will be further illustrated with respect to the following Examples which are not intended to limit the scope of the invention in any way, but which are intended to more fully illustrate and illuminate the invention.

Examples

In a laboratory test, a solution was made by dissolving 18 grams of commercially available benzyl C12-C16 alkyl dimethyl ammonium chloride into 82 grams of methanol solvent.

In test A, 7 mL brine A were put into a series of half-oz. bottles, then the desired amount of scale inhibitor was dosed into the bottles. After shaking thoroughly to mix NaCl solution and scale inhibitors, 2.5 mL brine B were added to each bottle to create halite scale (saturation index=0.08 at 70° F. (21° C.)), and these bottles were immediately inverted three times to assure thorough mixing of the components. The blank sample contained equal volume mixtures of brine A and brine B to represent a brine with no protection against scale formation. All bottles were capped and placed on a countertop at ambient temperature. Visual observations of the resulting inhibited solutions were made periodically after the addition of each halite scale inhibitor. It can be seen in Table II and FIG. 1 that the presence of 1000 ppm to 2000 ppm quaternary ammonium compound solution can mitigate the formation of halite scale effectively.

TABLE I

BRINE COMPOSITION

| Ions | Units | Brine A | Brine B | Mixture of Brine A and B (7 mL to 2.5 mL V/V) |
|---|---|---|---|---|
| $Na^+$ | mg/L | 119,000 | | 87,684 |
| $K^+$ | mg/L | 8,317 | 8,317 | 8,317 |
| $Mg^{2+}$ | mg/L | | 4,950 | 1,302 |
| $Ca^{2+}$ | mg/L | | 141,666 | 37,280 |
| $Sr^{2+}$ | mg/L | | 6,458.33 | 1,699.56 |
| $Cl^-$ | mg/L | 191,036 | 277.813 | 213,872 |

TABLE II

Inhibition Performance of Benzyl-C12-C16-alkyldimethyl Chloride at Ambient Temperature with Halite Saturation Index (SI) = 0.08

| | | Dosage | Observations | | |
|---|---|---|---|---|---|
| Ex. | Inhibitor Sample | (ppm) | 15 min. | 30 min. | 60 min. |
| 1 | benzyl-C12-C16- | 1000 | LP | LP | LP |
| 2 | alkyldimethyl | 2000 | Clear | LP | LP |
| 3 | chloride | 3000 | LP | SP | SP |
| 4 | Blank | 0 | SP | P | P |

NOTE:
LP = light precipitate
SP = some precipitate
P = precipitate
HP = heavy precipitate With reference to FIG. 1, it should be noted that the halite scale has precipitated out on the bottom of the bottles. Much fewer halite particles are observed in the bottoms of the testing bottles in the presence of benzyl-C12-C16-alkyldimethyl chloride. The cloudy appearance of the liquids in the bottles for Examples 1, 2, and 3 is caused by the insufficient dissolving of the organic chemical solvent in the brine.

Figure 2:
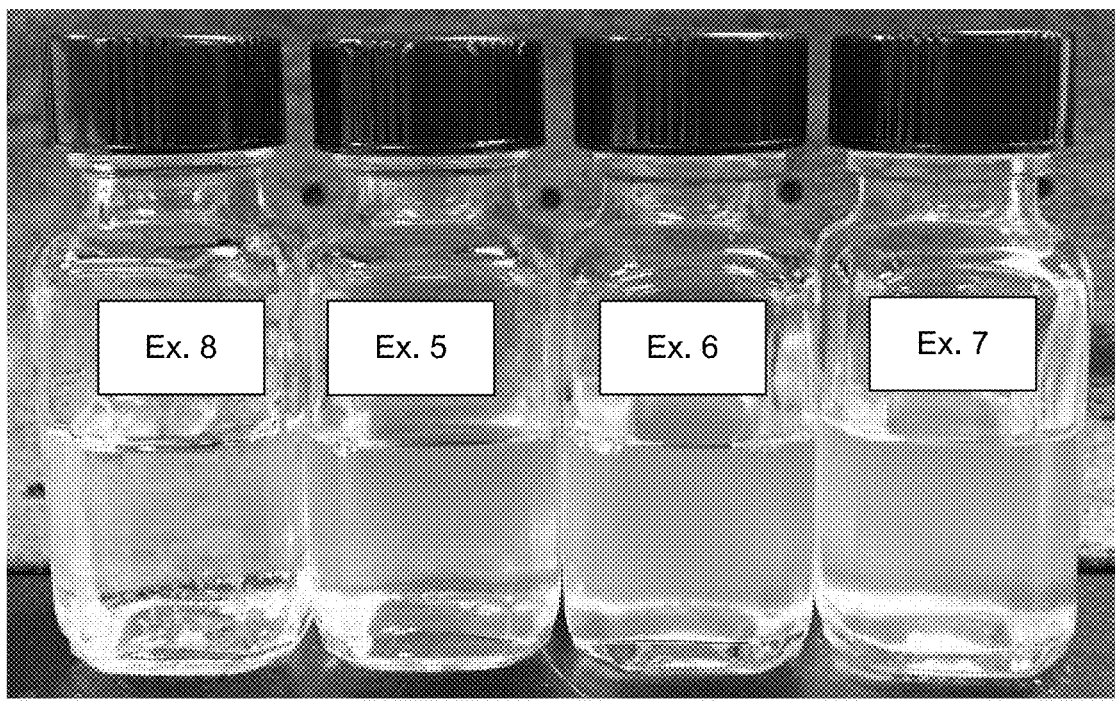
FIG. 2 is a photograph of four bottles of a brine having none and various dosages of benzyl-alkyldimethyl chloride after cooling down to ambient temperature for 60 minutes.

In test B, 7 mL brine A were put into a series of half-oz. bottles, then the desired amount of halite scale inhibitor was dosed into the bottles. After shaking thoroughly to mix NaCl solution and scale inhibitors, 2.5 mL brine B were added to each bottle, and these bottles were immediately inverted three times to assure thorough mixing of the components. The blank sample contained equal mixtures of Brine A and brine B to represent a brine with no protection against scale formation. All bottles were capped and placed in water bath to heat at 80° C. to ensure thorough dissolving. After heating for 60 minutes, all bottles were placed on countertop and cool to ambient temperature (21° C.). Visual observations of the resulting inhibited solutions were made periodically after the addition of each scale inhibitor. FIG. 2 shows that the presence of benzyl-C12-C16-alkyldimethyl chlorides can defer the formation of halite deposit significantly. FIG. 2 is a photograph of four bottles of a brine having none and various dosages of benzyl-alkyldimethyl chloride after cooling down to ambient temperature for 60 minutes, where from left to right, Example 8 is a blank, Example 5 has 1000 ppm of the quaternary ammonium compound, Example 6 has 2000 ppm of the quaternary ammonium compound, and Example 7 has 3000 ppm of the quaternary ammonium compound. The saturation index is again 0.08.

In the foregoing specification, the invention has been described with reference to specific embodiments thereof, and it is expected to be effective in inhibiting and preventing the formation of silicate scales. However, it will be evident that various modifications and changes can be made thereto without departing from the broader spirit or scope of the invention as set forth in the appended claims.

Accordingly, the specification is to be regarded in an illustrative rather than a restrictive sense. For example, specific quaternary ammonium compounds, organic solvents, and brines, other than those specifically exemplified or mentioned, and/or in different proportions or dosages, falling within the claimed parameters, but not specifically identified or tried in a particular application to inhibit or prevent halite scales, are within the scope of this invention. Similarly, it is expected that the inventive compositions will find utility in inhibiting and preventing the formation of halite scales for other fluids besides those in the oil field.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed. For instance, there is provided a method for inhibiting or preventing the formation of halite scales in an oilfield brine, which method comprises adding to an oilfield brine having a potential for halite scaling an amount of an additive effective to inhibit or prevent the formation of halite scales in the oilfield brine, where the additive comprises, consists essentially of, or consists of at least one quaternary ammonium compound that is benzyl-alkyldimethyl ammonium chloride, where the alkyl group has from 2 to 30 carbon atoms and at least one organic solvent.

There may also be provided in a non-limiting embodiment a treated oilfield brine comprising, consisting essentially of, or consisting of, an oilfield brine having a potential for halite scaling and an additive in an amount effective to inhibit or prevent the formation of halite scales in the oilfield brine, where the additive comprises, consists essentially of, or consists of, at least one quaternary ammonium compound that is benzyl-alkyldimethyl ammonium chloride, where the alkyl group has from 2 to 30 carbon atoms and at least one organic solvent.

The words "comprising" and "comprises" as used throughout, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for inhibiting or preventing the formation of halite scales in an oilfield brine, which method comprises adding to an oilfield brine having a potential for halite scaling an amount of an additive effective to inhibit or prevent the formation of halite scales in the oilfield brine, where the additive comprises:
   at least one quaternary ammonium compound that is benzyl-alkyldimethyl ammonium chloride, where the alkyl group has from 2 to 30 carbon atoms; and
   at least one organic solvent.

2. The method of claim 1 where the quaternary ammonium compound is non-water-soluble and has an average molecular weight of from about 150 to about 700.

3. The method of claim 1 where the organic solvent is selected from the group consisting of methanol, ethanol, diethylene glycol, triethylene glycol, and combinations thereof.

4. The method of claim 1 where in the additive, the amount of the quaternary ammonium compound in the additive ranges from about 0.1 wt % to about 95 wt %.

5. The method of claim 1 where the effective amount of the quaternary ammonium compound in the brine ranges from about 5 to about 7,500 ppm.

6. The method of claim 1 where a temperature of the oilfield brine containing the additive ranges from about 0° C. to about 350° C.

7. The method of claim 1 further comprising adding an additional component selected from the group consisting of:
   a second halite scale inhibitor, wherein the second halite scale inhibitor is selected from the group consisting of nitrilotriacetamide (NTAA), potassium ferrocyanide ($K_3Fe(CN)_6$), and combinations thereof; and
   a mineral scale inhibitor selected from the group consisting of a phosphonic acid, a phosphoric acid, a phosphorous acid, phosphate esters, phosphonate/phosphonic acids, aminopolycarboxylic acids, chelating agents, polymeric inhibitors and salts thereof, organo phosphonates, organo phosphates, phosphate esters and the corresponding acids and salts of these organo phosphonates, organo phosphates, phosphate esters, polyacrylamides, salts of acrylamido-methyl propane sulfonate/acrylic acid copolymer (AMPS/AA), phosphonated maleic copolymer (PHOS/MA), sodium salt of polymaleic acid/acrylic acid/acrylamido-methyl propane sulfonate terpolymers (PMA/AMPS), amino trimethylene phosphonic acid (ATMP), 1-hydroxyethylidene-1,1-diphosphonic acid (HEDP), 2-phosphonobutane-1,2,4-(tricarboxylic acid (PBTC), 2-hydroxyethyl-amino-bis(methylenephosphonic acid (HEAMBP), ethylene di amine tetrakis (methylene phosphonic acid) (EDTMP), tetramethylenediamine-tetrakis-(methyl ene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DTMPM), bis (hexamethylene triamine penta (methylene phosphonic acid) (BHPMP), polyamino polyether methylene phosphonate (PAPEMP) or a salt thereof, phosphino-polycarboxylate (PPCA), polyacrylate (PAA), polymaleic acid (PMA), an acrylic copolymer, sulfonate polyacrylate co-polymer, polyvinyl sulfonate, carboxymethyl inulin, polyaspartates, and combinations thereof.

8. A method for inhibiting or preventing the formation of halite scales in an oilfield brine, which method comprises adding to an oilfield brine having a potential for halite scaling an amount of an additive effective to inhibit or prevent the formation of halite scales in the oilfield brine, where the additive comprises:
   at least one non-water-soluble quaternary ammonium compound that is benzyl-alkyldimethyl ammonium chloride, where the alkyl group has from 2 to 30 carbon atoms and has an average molecular weight of from about 150 to about 700; and
   at least one organic solvent selected from the group consisting of methanol, ethanol, diethylene glycol, triethylene glycol, and combinations thereof.

9. The method of claim 8 where in the additive, the amount of the quaternary ammonium compound in the additive ranges from about 0.1 wt % to about 95 wt %.

10. The method of claim 8 where the effective amount of the quaternary ammonium compound in the brine ranges from about 5 to about 7,500 ppm.

11. The method of claim 8 where a temperature of the oilfield brine containing the additive ranges from about 0° C. to about 350° C.

12. The method of claim 8 further comprising adding an additional component selected from the group consisting of:
   a second halite scale inhibitor selected from the group consisting of nitrilotriacetamide (NTAA), potassium ferrocyanide ($K_3Fe(CN)_6$), and combinations thereof; and
   a mineral scale inhibitor selected from the group consisting of a phosphonic acid, a phosphoric acid, a phosphorous acid, phosphate esters, phosphonate/phosphonic acids, aminopolycarboxylic acids, chelating agents, polymeric inhibitors and salts thereof, organo phosphonates, organo phosphates, phosphate esters and the corresponding acids and salts of these organo phosphonates, organo phosphates, phosphate esters, polyacrylamides, salts of acrylamido-methyl propane sulfonate/acrylic acid copolymer (AMPS/AA), phosphonated maleic copolymer (PHOS/MA), sodium salt of polymaleic acid/acrylic acid/acrylamido-methyl propane sulfonate terpolymers (PMA/AMPS), amino trimethylene phosphonic acid (ATMP), 1-hydroxyethylidene-1,1-diphosphonic acid (HEDP), 2-phosphonobutane-1,2,4-(tricarboxylic acid (PBTC), 2-hydroxyethyl-amino-bis(methylenephosphonic acid (HEAMBP), ethylene diamine tetrakis (methylene phosphonic acid) (EDTMP), tetramethylenediamine-tetrakis-(methyl ene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DTMPM), bis (hexamethylene triamine penta (methylene phosphonic acid) (BHPMP), polyamino polyether methylene phosphonate (PAPEMP) or a salt thereof, phosphino-polycarboxylate (PPCA), polyacrylate (PAA), polymaleic acid (PMA), an acrylic copolymer, sulfonate polyacrylate co-polymer, polyvinyl sulfonate, carboxymethyl inulin, polyaspartates, and combinations thereof.

* * * * *